UNITED STATES PATENT OFFICE.

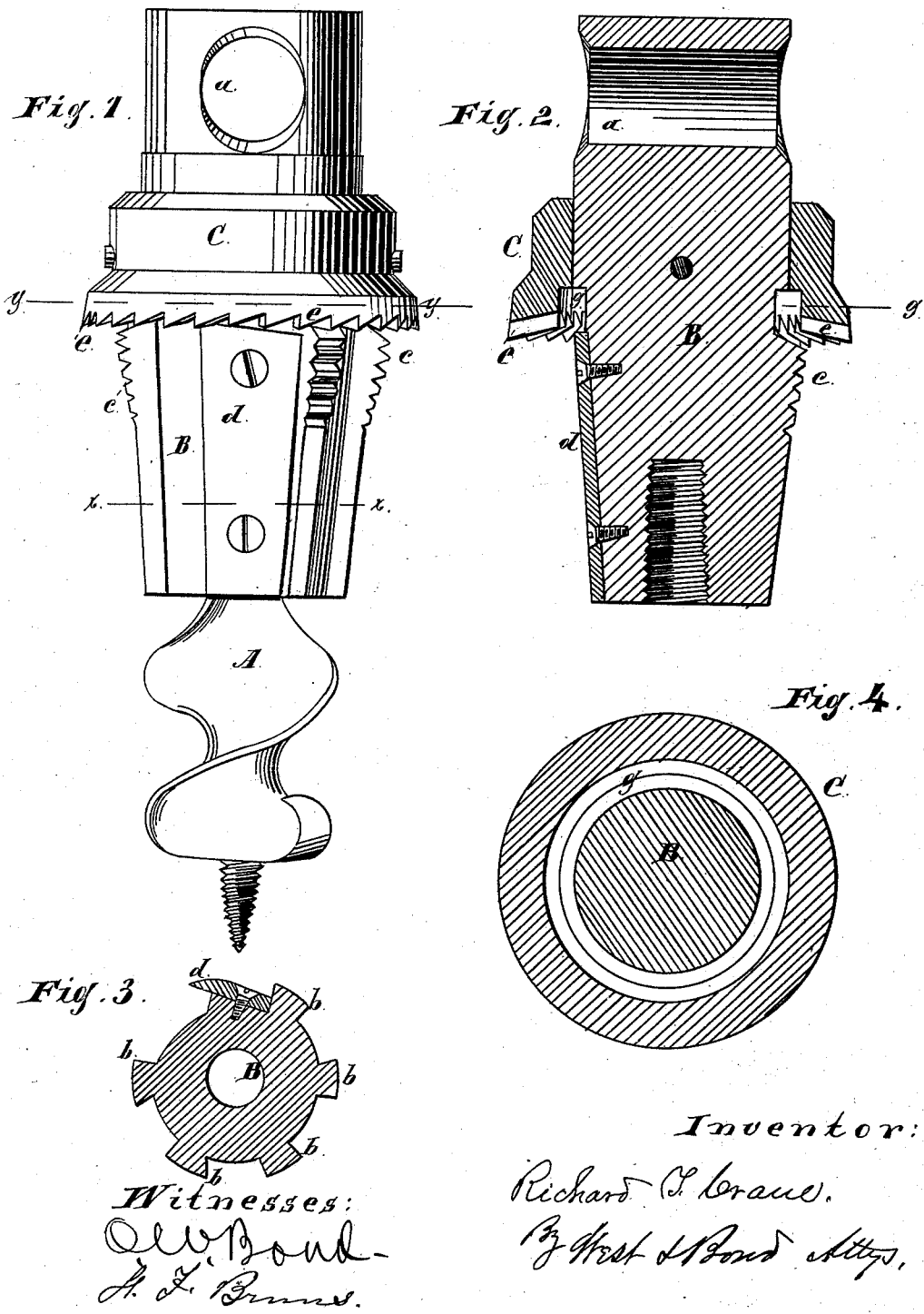

RICHARD T. CRANE, OF CHICAGO, ILLINOIS.

IMPROVEMENT IN BORING AND REAMING TOOLS.

Specification forming part of Letters Patent No. 216,023, dated June 3, 1879; application filed February 27, 1879.

*To all whom it may concern:*

Be it known that I, RICHARD T. CRANE, of Chicago, Cook county, State of Illinois, have invented a new and useful Improvement in Boring and Reaming Tools, of which the following is a full description, reference being had to the accompanying drawings, in which—

Figure 1 is an elevation; Fig. 2, a vertical section; Fig. 3, a section at line $x\ x$ of Fig. 1; Fig. 4, a section at line $y\ y$ of Fig. 1.

It is common to use metallic bushes for the bung-holes of beer and other barrels, and it is customary to insert such bushes, which are screwed-threaded on the outside, into the holes in the staves without providing grooves to receive the screw-threads of the bushes, which operation requires great force, and frequently a stave is split.

The object of my invention is to provide a tool by the use of which the hole for the bush can be made, and a groove be also cut in its wall to receive the screw-thread of the bush, to facilitate its insertion, and also to provide the same tool with a cutter which will make a countersink in the face of the stave to receive the rim or flange of the bush; and the invention consists in the devices and combinations hereinafter specifically claimed.

In the drawings, A represents an auger. B is a tool by the use of which the hole for the bung-bush can be reamed, and also provided with a groove in the wall thereof to receive the thread of the bush. In the upper end of this tool B is a hole, $a$, to receive a handle or lever.

The body of this tool or reaming-tap B can be most conveniently made of cast-iron, and the lower portion is provided with a number of vertical ribs, $b$, cast with it. I leave the lower portion of the outer surface of these ribs smooth; but the upper part of each rib is provided with teeth $c$, having cutting-edges, which teeth are so formed and arranged that they will cut a groove in the wall of the hole for the bush, adapted to receive the screw-thread of the bush.

$d$ is a knife or cutter, secured by screws, or in some other suitable manner, to B, and so arranged that its edge will trim the wall of the hole bored in the stave.

C is a ring of cast-iron fitting the upper end of the part B. The under surface of this piece C is provided with a series of cutting-teeth, by means of which a countersink can be cut in the stave to receive the flange of the bush.

The lower part of this ring C is somewhat larger than the upper portion, as shown, and it is cut away a little on the inside, leaving a space, $g$, between the inner wall of C and the part B at this point. C is secured to B by a pin.

The lower half of B is, as shown, tapering, to correspond with the taper of the bush to be used.

The auger may be connected with B by means of a screw-thread or in any other suitable manner.

In use the hole for the bush can be bored in the stave with the auger A. Then B is pushed down into the hole, and by rotating B the hole will be reamed and made uniform by the action of the cutter $d$, after which by the cutting-teeth $c$ a groove can be cut in the wall of such hole adapted to receive the screw-thread of the bush. Then, if desired, a countersink can be cut in the stave around the hole for the bush by means of the cutting-teeth $e$, to receive the rim of the bush.

What I claim as new, and desire to secure by Letters Patent, is as follows:

1. A tool consisting of an auger, A, and a reaming-tap, B, which is provided with one or more cutters, $d$, and with ribs $b$, having cutting-teeth, substantially as and for the purposes specified.

2. The reaming-tap B, in combination with a series of horizontal cutting-teeth, $e$, suitably connected with such tap, substantially as and for the purposes specified.

3. A tool consisting of an auger, A, and a reaming-tap, B, which is provided with one or more cutters, $d$, and with ribs $b$, having cutting-teeth $c$, in combination with a series of horizontal cutting-teeth, $e$, substantially as and for the purposes specified.

RICHARD T. CRANE.

Witnesses:
E. A. WEST,
O. W. BOND.